Patented Apr. 27, 1926.

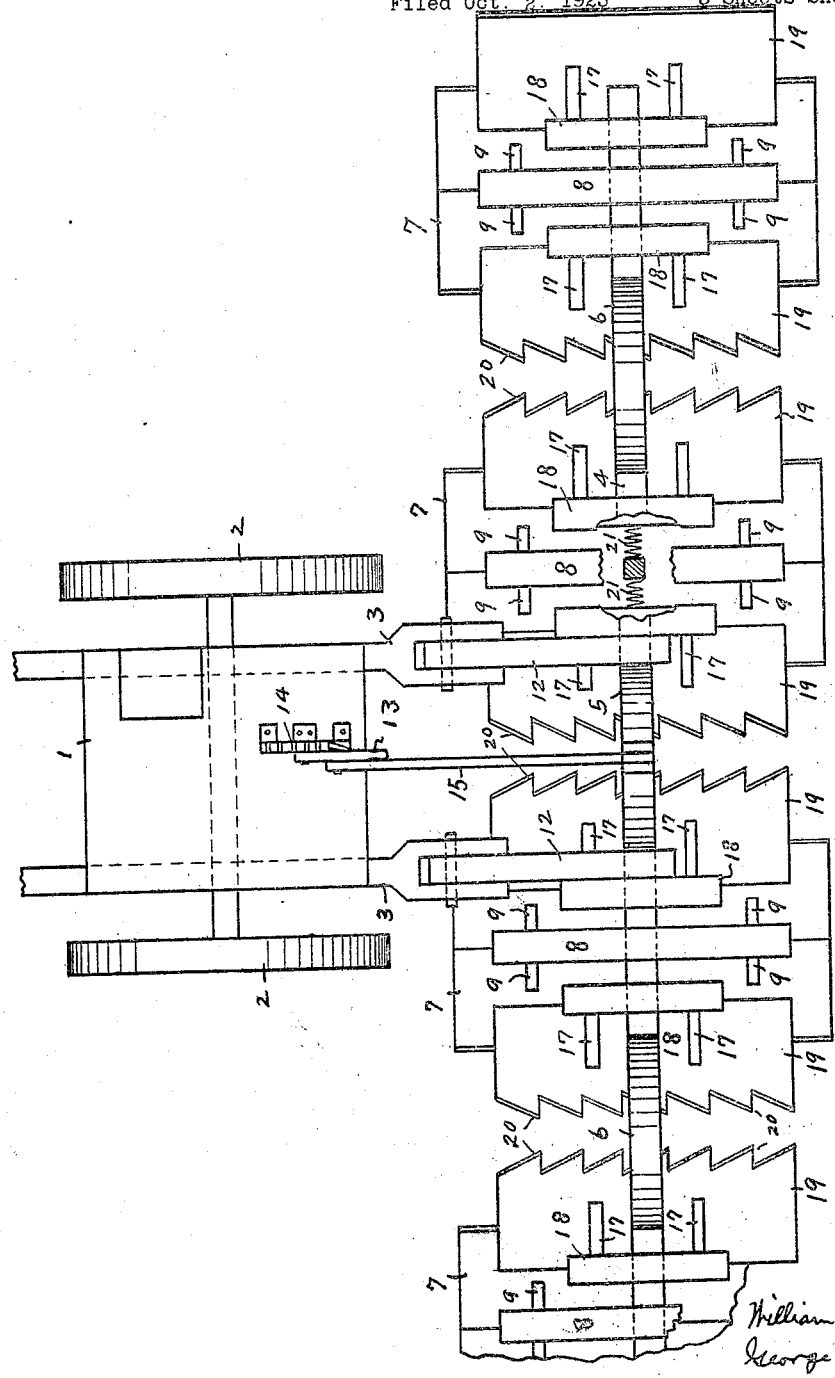

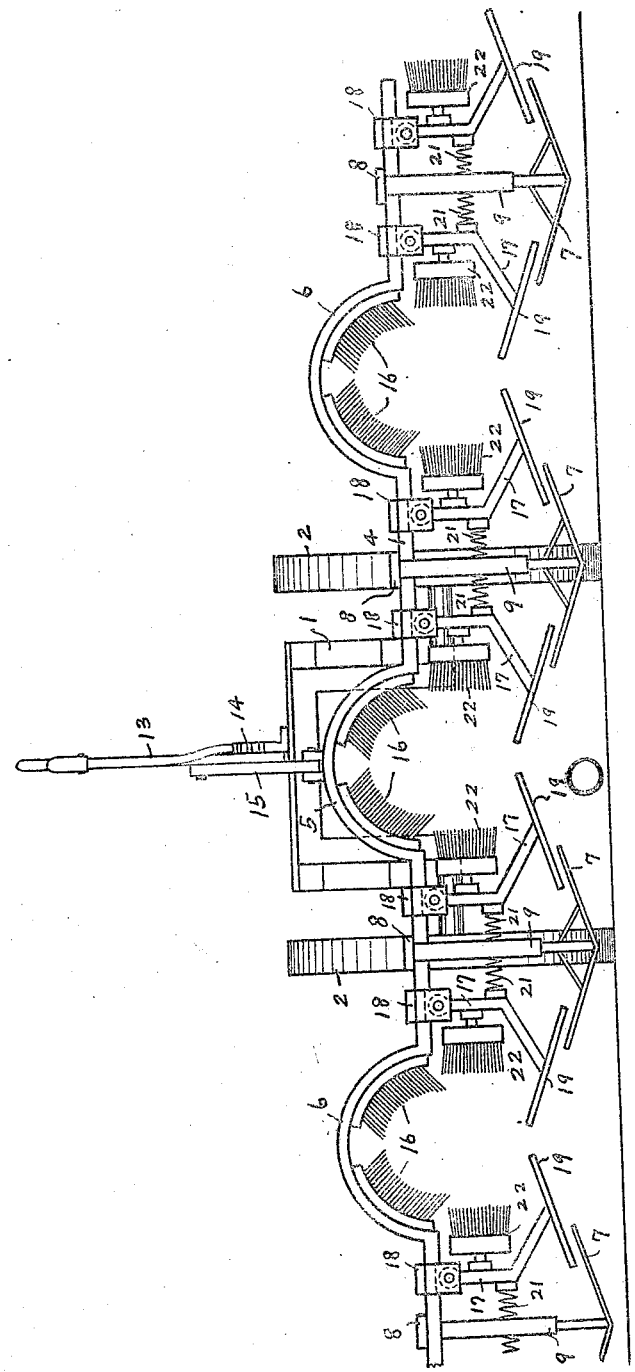

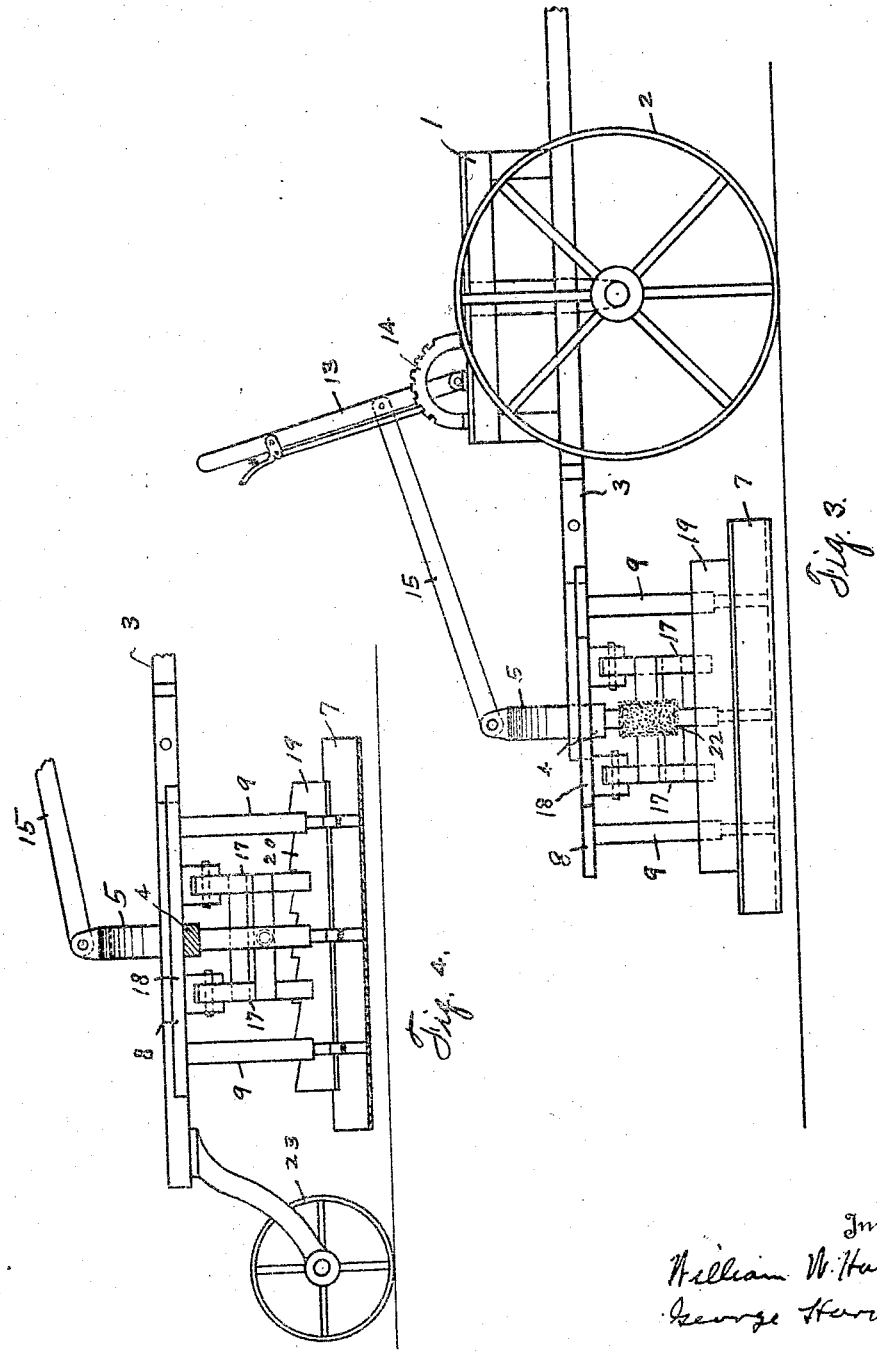

1,582,466

UNITED STATES PATENT OFFICE.

WILLIAM W. HARWOOD, OF GRANNIS, ARKANSAS, AND GEORGE HARWOOD, OF DICKINSON, TEXAS.

INSECT DESTROYER.

Application filed October 2, 1923. Serial No. 666,090.

*To all whom it may concern:*

Be it known that we, WILLIAM W. HARWOOD and GEORGE HARWOOD, citizens of the United States, residing at Grannis and Dickinson, in the counties of Polk and Galveston and States of Arkansas and Texas, respectively, have invented certain new and useful Improvements in an Insect Destroyer, of which the following is a specification.

This invention relates to new and useful improvements in an insect destroyer, and has particular relation to an apparatus for exterminating the boll weevil.

One object of the invention is to provide an apparatus of the character described of such construction that it will readily pass along one or more rows of plants, such as cotton plants, and by agitating the plants will knock the weevil and similar insects off of the plants, said apparatus embodying also receiving pans into which the insects fall to be destroyed.

Another object of the invention resides in the provision of an apparatus of the character described that may be readily attached to a horse drawn vehicle or a motor vehicle, and which may be driven through grown crops without in any manner injuring the plants.

With the above and other objects in view, the invention has particular relation to certain other novel features of construction, operation, and arrangement of parts, an example of which is given in this specification, and illustrated in the accompanying drawings, wherein:—

Figure 1 shows a plan view of the device partly broken away, for the sake of clearness.

Figure 2 shows a front elevation thereof,

Figure 3 shows an end view thereof; and,

Figure 4 shows a fragmentary, longitudinal, vertical sectional view of the form of the device as it will be used when attached to a horse drawn vehicle.

Referring now more particularly to the drawings, wherein like numerals of reference designate similar parts in each of the figures, the numeral 1 designates a supporting frame which is mounted on the carrier wheels 2, 2, said frame having suitable side members, as 3, 3.

There is a transverse supporting bar 4, having a central arch as 5, and one or more side arches as 6, 6, said arches being provided to pass over the rows of plants. On each side of each arch there is a receiving pan as 7, formed of a suitable metallic plate, said pans being suspended from the cross bars 8, by suitable hangers 9, said cross bars being mounted on the arch bar 4. The arch bar 4 is fastened to the rear ends of the arms 12, 12; and the other ends of these arms are pivoted to the respective side members 3. Pivoted to the framework 1, there is a manual lever 13, and associated therewith there is the usual rack-and-dog arrangement 14. The lever is connected to the center of the arch bar 4 by means of a suitable link 15. By manipulating the lever 13, it is evident that the arch bar 4 and its appendants may be elevated and lowered. This provision for adjusting said arch bar is particularly necessary so that the entire apparatus carried by said bar may be elevated above the plants when turning the apparatus around.

As clearly shown in Figure 2 each arch carries inside inwardly projecting brushes 16, arcuate in general contour.

Depending from the arch bar 4, on each side of each of the arches 5 and 6, are the hangers 17, 17. These hangers are pivoted to corresponding cross bars 18, 18, carried by the arch bar 4. The lower ends of each pair of hangers support a plate 19, four sets of guide plates being shown. The plates of each set decline toward each other, and their inner edges overlap the corresponding edges of the pans 7. As shown in Figures 1 and 4 the opposite edges of said guide plates are spaced apart to permit them to pass along each side of the corresponding row of plants, but have inclined teeth as 20 so that in passing the plants they will agitate said plants. The hangers 17 work against coil springs as 21 so that the plates will yield and not injure the plants. The hangers 17 carry the inwardly extending brushes 22, which, in combination with the corresponding brushes 16, form substantially an arched brush around the plants, over which the apparatus passes. These brushes further agitate said plants and assist in knocking off the weevil and insects and larvae therefrom, which fall on the guide plates 19, and are delivered by them to the pans 7. If desired, the arch bar 4, may be provided with the additional supporting wheel 23, as in certain cases this will be necessary.

What we claim is:

1. A device of the character described including a support formed with a plurality of arch-like agitating members, hangers pivoted to said support and arranged on opposite sides of said agitating members, deflectors arranged beneath said agitating members and spaced apart and anchored to said respective hangers, yieldable members normally holding said deflectors in a fixed relation to each other but yielding to permit said deflectors to spread apart, agitating brushes carried by the hangers, receiving pans depending from said support and disposed to receive from said deflectors.

2. A device of the character described including a support formed with a plurality of arch-like agitating members, hangers pivoted to said support and arranged on opposite sides of said agitating members, deflectors arranged beneath said agitating members and spaced apart and anchored to said respective hangers, yieldable members normally holding said deflectors in a fixed relation to each other but yielding to permit said deflectors to spread apart, agitating brushes carried by the hangers, receiving pans depending from said support and disposed to receive from said deflectors.

3. A device of the character described including a support formed with a plurality of arch-like agitating members, hangers pivoted to said support and arranged on opposite sides of said agitating members, deflectors arranged beneath said agitating members and spaced apart and anchored to said respective hangers, yieldable members normally holding said deflectors in a fixed relation to each other but yielding to permit said deflectors to spread apart, agitating brushes carried by the hangers, receiving pans depending from said support and disposed to receive from said deflectors, a carrier to which said support is hinged and means for elevating and lowering said support and the appendants thereof, relative to the carrier.

In testimony whereof we have signed our names to this specification.

WILLIAM W. HARWOOD.
GEORGE HARWOOD.